(12) United States Patent
Van Der Linde et al.

(10) Patent No.: US 11,735,791 B2
(45) Date of Patent: Aug. 22, 2023

(54) SOLID-STATE BATTERY AND METHOD OF MAKING THE SAME

(71) Applicants: Richard Van Der Linde, San Jose, CA (US); Aditi Chandra, Los Gatos, CA (US); Mao Ito, Santa Cruz, CA (US); Alex Yan, San Jose, CA (US); Arvind Kamath, Los Altos, CA (US); Shoba Rao, San Jose, CA (US); Jonathon Y Simmons, San Jose, CA (US)

(72) Inventors: Richard Van Der Linde, San Jose, CA (US); Aditi Chandra, Los Gatos, CA (US); Mao Ito, Santa Cruz, CA (US); Alex Yan, San Jose, CA (US); Arvind Kamath, Los Altos, CA (US); Shoba Rao, San Jose, CA (US); Jonathon Y Simmons, San Jose, CA (US)

(73) Assignee: Ensurge Micropower ASA, Oslo (NO)

( * ) Notice: Subject to any disclaimer, the term of this patent is extended or adjusted under 35 U.S.C. 154(b) by 28 days.

(21) Appl. No.: 17/185,111

(22) Filed: Feb. 25, 2021

(65) Prior Publication Data
US 2021/0320355 A1   Oct. 14, 2021

Related U.S. Application Data

(60) Provisional application No. 63/008,406, filed on Apr. 10, 2020.

(51) Int. Cl.
*H01M 10/058* (2010.01)
*H01M 50/186* (2021.01)

(52) U.S. Cl.
CPC ....... *H01M 50/186* (2021.01); *H01M 10/058* (2013.01)

(58) Field of Classification Search
CPC ............. H01M 50/186; H01M 10/058; H01M 10/0525; H01M 4/13; H01M 4/30; H01M 50/30; H01M 10/05
See application file for complete search history.

(56) References Cited

U.S. PATENT DOCUMENTS 9,183,973 B2   10/2015   Kamath et al.
9,299,845 B2   3/2016   Kamath et al.
(Continued)

OTHER PUBLICATIONS

"Tesla's Huge Mistake: Why Thin-Film Lithium Ion Batteries Won't Power the EV Revolution", Modis, May 20, 2016. Retrieved online on Nov. 17, 2022 from: https://seekingalpha.com/article/3976731-teslas-huge-mistake-why-thin-film-lithium-ion-batteries-wont-power-ev-revolution.*
(Continued)

*Primary Examiner* — Kenneth J Douyette
(74) *Attorney, Agent, or Firm* — Andrew D. Fortney; Central California IP Group, P.C.

(57) ABSTRACT

The present disclosure pertains to a battery and a method of making the same. The battery includes first and second metal substrates, a first solid-state and/or thin-film battery cell on the first metal substrate, a second solid-state and/or thin-film battery cell on the second metal substrate, and a hermetic seal in a peripheral region of the first and second metal substrates. The first and second battery cells are between the first and second metal substrates, and face each other. The method includes respectively forming first and second solid-state and/or thin-film battery cells on first and second metal substrates, placing the second battery cell on the first battery cell so that the first and second battery cells are between the first and second metal substrates, and hermetically sealing the first and second battery cells in a peripheral region of the first and second metal substrates.

21 Claims, 7 Drawing Sheets

(56) References Cited

U.S. PATENT DOCUMENTS

| | | | |
|---|---|---|---|
| 2003/0064171 A1* | 4/2003 | Burrows | H01L 23/562 257/E23.194 |
| 2008/0003492 A1* | 1/2008 | Bates | H01M 50/121 429/185 |
| 2010/0310941 A1* | 12/2010 | Kumta | H01B 1/04 429/231.95 |
| 2012/0135292 A1* | 5/2012 | Buckingham | H01M 50/124 427/126.3 |
| 2019/0165342 A1* | 5/2019 | Berland | H01M 50/183 |
| 2020/0127021 A1 | 4/2020 | Sreenivasan et al. | |

OTHER PUBLICATIONS

"Batteries Behaving Badly", Austin Weber, Nov. 26, 2008. Retrieved online on Nov. 17, 2022 from: https://www.assemblymag.com/articles/86113-batteries-behaving-badly.*

"Vacuum-Enabled Thin Film Deposition Advances Energy Storage Technologies", Kurt J Lesker Company, Jul. 20, 2016. Retrieved online on Nov. 17, 2022 from: https://www.lesker.com/blog/vacuum-enabled-thin-film-deposition-advances-energy-storage-technologies.*

Nancy J. Dudney; "Thin Film Micro-Batteries"; Fall 2008; Interface, pp. 44-48; The Electrochemical Society, Pennington, NJ.

"Speedy Ion Conduction in Solid Electrolytes Clears Road for Advanced Energy Devices"; May 5, 2016; Oak Ridge National Laboratory, https://www.ORNL.gov/news; 3 pgs.

Claus Daniel; "Materials and Processing for Lithium-ion Batteries"; JOM, vol. 60, No. 9, pp. 43-48; https://www.tms.org/pubs/journals/com.

* cited by examiner

SOLID-STATE BATTERY AND METHOD OF MAKING THE SAME

CROSS REFERENCE TO RELATED APPLICATION(S)

This application claims the benefit of U.S. Provisional Patent Application No. 63/008,406, filed on Apr. 10, 2020, incorporated herein by reference as if fully set forth herein.

FIELD OF THE INVENTION

The present invention generally relates to the field of solid-state and/or thin film batteries. More specifically, embodiments of the present invention pertain to sealed solid-state and/or thin film batteries on a metal substrate, and methods of making the same.

DISCUSSION OF THE BACKGROUND

Solid state lithium batteries (SSLB) include thin film devices that contain, but are not restricted to, materials such as lithium (Li), lithium cobalt oxide (LCO) and lithium phosphorus oxynitride (LiPON) that, when exposed to moisture or air, typically react quickly and degrade the performance of the battery by the oxidation of free lithium and the hydrolysis of the electrolyte. As a result, SSLBs must be hermetically sealed to prevent degradation.

In addition, the battery cell undergoes a physical volume change (up to about 20% of the cathode thickness) due to physical movement of the lithium in typical SSLB encapsulation schemes. For some applications, however, the expansion/contraction of the battery and/or its packaging should be substantially or completely eliminated.

Traditional high energy density SSLBs are on rigid substrates, such as silicon or a ceramic, that require additional coatings on and around the cell to hermetically seal it. These additional coatings also need to be robust to the expansion and contraction of the cell during charging and discharging (typically +/−10% of the cathode thickness). These coatings tend to include multiple layers and are often thicker than the cell stack (not including the substrate), thereby reducing the volumetric energy density significantly. On the other hand, a rigid seal (such as that provided by a silicon or ceramic substrate) can be brittle and difficult to process during assembly.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to solid-state and thin film batteries, and more specifically to solid-state and thin film batteries on a metal substrate. Embodiments of the present invention pertain to devices having a two-cell structure, and methods of manufacturing the same.

In one aspect, the present invention relates to a battery, comprising a first metal substrate, a second metal substrate, a first solid-state and/or thin-film battery cell on the first metal substrate, a second solid-state and/or thin-film battery cell on the second metal substrate, and a hermetic seal in a peripheral region of the first and second metal substrates. The first and second battery cells are between the first and second metal substrates and face each other. The hermetic seal is configured to protect the first and second battery cells from damage and/or deleterious effects of oxygen and/or water.

In general, each of the first and second battery cells may comprise a cathode current collector on the respective metal substrate, a cathode on or over the cathode current collector, a solid-phase electrolyte on or over the respective cathode, and an anode current collector on or over the respective electrolyte. In such embodiments, each anode current collector may have a major surface facing the major surface of the other anode current collector.

In some embodiments, each of the first and second metal substrates comprises a metal foil. The metal foil may comprise steel, copper, aluminum, nickel, inconel, brass, molybdenum or titanium. Each of the elemental metals (copper, aluminum, nickel, molybdenum or titanium) may be alloyed with up to 10% of one or more other elements to improve one or more physical and/or chemical properties thereof. The physical and/or chemical properties that may be improved by alloying include oxygen and/or water permeability, flexibility, and resistance to corrosion or chemical attack during subsequent processing. In one example, the metal foil comprises a stainless steel foil.

In other or further embodiments, each of the first and second metal substrates may further comprise a first barrier covering an inner major surface of the metal foil and a second barrier covering an outer major surface of the metal foil. In addition, each of the first and second metal substrates may further comprise a third barrier along one or more edges of the metal foil. The barrier may inhibit or prevent migration or diffusion of metal atoms from the substrate into one or more layers of the battery, and may also provide resistance to corrosion of or chemical attack on the metal foil.

In various embodiments, the hermetic seal may comprise an ultrasonic weld, an epoxy layer, an anodic seal, or a laser weld. The hermetic seal, for example, may be within 10 mm of all edges of the first and second metal substrates. In some cases, the hermetic seal may be within 5 mm of all edges of the first and second metal substrates. When the hermetic seal comprises the ultrasonic weld, the anodic seal or the laser weld, the first and second metal substrates may contact each other in the hermetic seal. Alternatively, when the hermetic seal comprises the ultrasonic weld, the anodic seal or the laser weld, the cathode current collector on the first metal substrate may contact the cathode current collector on the second metal substrate in the hermetic seal. In other embodiments, when the hermetic seal comprises the ultrasonic weld, the anodic seal or the laser weld, the first barrier on the first metal substrate contacts the first barrier on the second metal substrate in the hermetic seal. When the hermetic seal comprises the epoxy layer, each of the cathode current collectors may be in ohmic contact with a corresponding first terminal tab, and each of the anode current collectors may be in ohmic contact with a corresponding second terminal tab.

In embodiments including cathode and anode current collectors, each cathode current collector and each anode current collector may comprise one or more terminal connection regions at an end or side thereof. In such embodiments, the battery may further comprise a first terminal tab in ohmic contact with at least one of the cathode current collectors and a second terminal tab in ohmic contact with at least one of the anode current collectors. In further embodiments, each electrolyte may further comprise, for each terminal connection region of each anode current collector, a terminal connector support region between the metal substrate and the corresponding terminal connection region(s) of the anode current collector.

In some embodiments, all of the terminal connection regions are at the same end or side of the corresponding metal substrate. In other embodiments, the terminal connection region(s) of the cathode current collector and the terminal connection region(s) of the anode current collector are at opposite ends or sides of the corresponding metal substrate.

In some embodiments, the battery further comprises an interstitial ring or spacer between the first and second battery cells. The interstitial ring or spacer may comprise an insulating organic polymer and/or may have a thickness of 1-5 mm.

The invention may further concern an electrical device, comprising the present battery and an integrated circuit (e.g., a processor, a memory, a plurality of input and/or output terminals, etc.), a sensor, or a combination thereof. The integrated circuit and/or sensor may be on the same substrate as one or more of the battery cells or on a different substrate. The integrated circuit and/or sensor receive power (e.g., an electric potential) from the battery.

In another aspect, the present invention relates to a method of manufacturing an electronic device (such as a battery), comprising forming a first solid-state and/or thin-film battery cell on a first metal substrate, forming a second solid-state and/or thin-film battery cell on a second metal substrate, placing the second battery cell on the first battery cell so that the first and second battery cells are between the first and second metal substrates, and hermetically sealing the first and second battery cells between the first and second metal substrates in a peripheral region of the first and second metal substrates.

In general, forming each of the first and second battery cells may comprise forming a cathode current collector on the respective metal substrate, forming a cathode on or over the cathode current collector, forming an electrolyte on or over the respective cathode, and forming an anode current collector on or over the respective electrolyte. The method may also comprise forming one or more electrical devices, such as an integrated circuit, a memory, a sensor, or a combination thereof on the same substrate as one of the battery cells or on a different substrate. The electrical device(s), when present, receive power (e.g., an electric potential) from the battery.

In some embodiments, each of the first and second metal substrates comprises a metal foil. For example, similar to the present battery, the metal foil may comprise steel, copper, aluminum, nickel, inconel, brass, molybdenum or titanium, the elemental metals of which may be alloyed with up to 10% of one or more other elements to improve one or more physical and/or chemical properties thereof. In one example, the metal foil comprises a stainless steel foil.

In some embodiments, the method may further comprise forming a barrier on entire major surfaces of the metal foil. In further embodiments, the method may further comprise forming an additional barrier along one or more edges of each metal foil.

In various embodiments of the method, hermetically sealing the first and second battery cells comprises ultrasonic welding, applying an electrostatic field to the peripheral region of the first and second metal substrates to form an anodic seal, or laser welding. For example, the peripheral region of the first and second metal substrates may be within 10 mm of all edges of the first and second metal substrates. As for the present battery, in some cases, the peripheral region of the first and second metal substrates may be within 5 mm of all edges of the first and second metal substrates.

Alternatively, hermetically sealing the first and second battery cells may comprise applying an epoxy adhesive in the peripheral region of one of the first and second metal substrates prior to placing the second battery cell on the first battery cell, and curing the epoxy adhesive. For example, curing the epoxy adhesive may comprise irradiating the epoxy adhesive with ultraviolet light.

In various embodiments, forming each of the cathode current collectors and each of the anode current collectors may further comprise forming one or more terminal connection regions at an end or side thereof. In such embodiments, the method may further comprise attaching or affixing (i) a first terminal tab to at least one of the cathode current collectors and (ii) a second terminal tab to least one of the anode current collectors. Alternatively or additionally, in such embodiments, each electrolyte may further comprise, for each terminal connection region of each anode current collector, a terminal connector support region between the metal substrate and the corresponding terminal connection region(s) of the anode current collector.

In some embodiments, as for the present battery, all of the terminal connection regions may be formed at a same end or side of the corresponding metal substrate. Alternatively, the terminal connection region(s) of the cathode current collector and the terminal connection region(s) of the anode current collector may be formed at opposite ends or sides of the corresponding metal substrate.

The capabilities and advantages of the present invention will become readily apparent from the detailed description of various embodiments below.

DETAILED DESCRIPTION

Figure 1A:
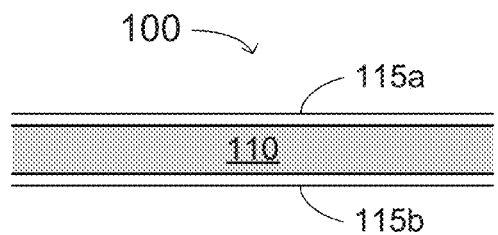
FIGS. 1A-5B show intermediate and final structures in an exemplary method of making a battery stack with tabbed terminals at one end of the battery, according to embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

In addition, for convenience and simplicity, the terms "part," "portion," and "region" may be used interchangeably but these terms are also generally given their art-recognized meanings. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Certain metal substrates, such as stainless steel, copper and aluminum foils or thin sheets, are flexible and provide a natural hermetic seal. By sealing two cells so that the metal substrate is on the outside of both cells, the energy storage capacity is doubled, without having to increase the area of the battery, thereby increasing the volumetric energy density of the battery. In further embodiments, an interstitial layer or spacer between the two cells can control the expansion and contraction of the cell(s).

For example, when a cell includes a substrate having a thickness of 20 μm, a cell stack having a thickness of 15 μm, and a hermetic sealing layer having a thickness of 20 μm, the sealing layer reduces the volumetric energy density of the battery by 57% relative to the battery in the absence of the sealing layer. This reduction in energy density becomes especially important when stacking multiple cells.

The expansion and contraction of a solid-state battery cell may present compatibility problems (among other possible problems) when the battery is sealed in another material in the final application. However, the interstitial ring or spacer adds minimal thickness to the cell, while at the same time allowing the cell to expand and contract without changing the volume of the battery.

Exemplary Two- or Multi-Cell Batteries

The present invention concerns a battery, comprising a first battery cell, an inverted second battery cell on the first battery cell, first and second metal foils over outermost surfaces of the respective first and second battery cells, and a hermetic seal in the first and second metal foils, surrounding and/or protecting the first and second battery cells.

Stainless steel, by its nature, is a hermetic sealing material that prevents moisture and air from penetrating through its bulk. Individual cells can be built on a stainless steel substrate, effectively sealing the backside of the cell from moisture or oxygen penetration. By sealing two (or more) cells together so that the substrates are on the outside, a full hermetic seal can be created.

Steel is, by nature, flexible and unbreakable (ductile). Thus, it can accommodate physical strain during expansion and contraction, unlike (multilayer) dielectric coatings, which tend to crack, especially as a function of thickness. For example, the thicker the dielectric coating, the lower the moisture penetration, but also the greater the probability that the dielectric coating will crack or otherwise become damaged. An interstitial ring or spacer added between adjacent cells (e.g., between the anode current collectors of adjacent cells) can provide space for expansion and contraction of materials in the cells, without significantly changing the volume of the package.

The following discussion provides examples of two-cell batteries and general manufacturing, sealing, and integration processes for such batteries.

An Exemplary Battery Stack and Method of Making the Same

FIGS. 1A-5B show intermediate and final structures in an exemplary method of making a battery stack with tabbed terminals at one end of the battery. FIGS. 1A, 2A, 3A, 4A and 5A are cross-sections of the structures, and FIGS. 1B, 2B, 3B, 4B and 5B are top-down or layout views of the structures.

Figure 1B:
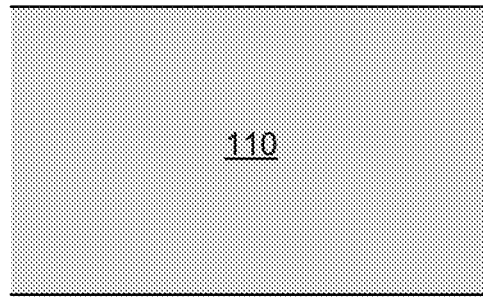

FIGS. 1A-B show a metal substrate 100, comprising a metal foil 110 and first and second barriers 115a-b on opposite major surfaces of the metal foil 110. In the layout view of FIG. 1B, the barrier 115a (which is coextensive with the metal foil 110) is not shown. The metal in the metal foil 110 may comprise or consist essentially of stainless steel, aluminum, copper, nickel, inconel, brass, molybdenum or titanium, the elemental metals of which may be alloyed with up to 10% of one or more other elements to improve one or more physical and/or chemical properties thereof (e.g., oxygen and/or water permeability, flexibility, resistance to corrosion or chemical attack during subsequent processing, etc.). However, the metal foil can also be a metal sheet or metal roll. For example, the metal foil may be 10-100 µm thick, whereas a metal sheet may have a thickness of >100 µm, up to about 1-2 mm, although the invention is not so limited.

The barrier 115a-b comprises one or more layers of one or more materials in a thickness effective to prevent migration of atoms or ions from the metal foil 110 into overlying layers. The material(s) may comprise a glass or ceramic, such as silicon dioxide, aluminum oxide, silicon nitride, a silicon and/or aluminum oxynitride, etc., or a metal nitride, such as aluminum nitride, titanium nitride, titanium aluminum nitride, tungsten nitride, etc. In some embodiments, each of the first and second barriers 115a-b comprises alternating glass/ceramic and metal nitride layers (e.g., a first metal nitride layer, a first glass/ceramic layer, and a second metal nitride layer, which may further comprise a second glass/ceramic layer, a third metal nitride layer, etc.). Each barrier 115a or 115b may have a total thickness of 0.5-3 µm, but the barrier 115 is not limited to this range. The barriers 115a-b may be blanket-deposited onto the metal foil 110 by chemical or physical vapor deposition, solution-phase coating with a precursor material followed by annealing to form the glass/ceramic or metal nitride, etc. Exemplary barrier materials, structures and thicknesses and methods for their deposition are disclosed in U.S. Pat. No. 9,299,845 and U.S. patent application Ser. No. 16/659,871, filed Oct. 22, 2019, the relevant portions of each of which are incorporated by reference herein.

Figure 2A:
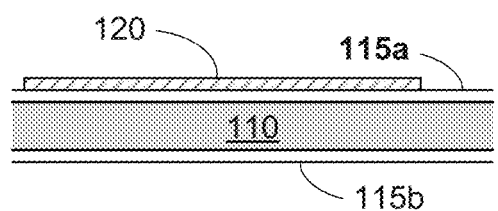
Figure 2B:
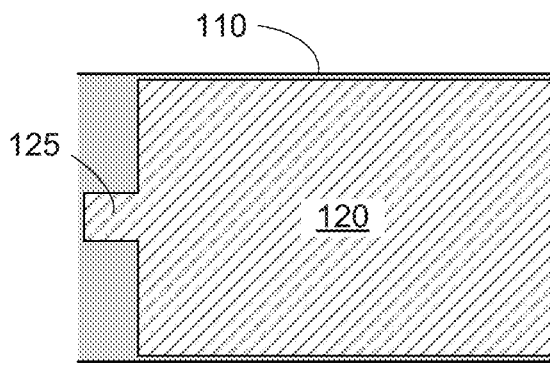

FIGS. 2A-B show the metal substrate 100 with a cathode current collector 120 thereon. The cathode current collector 120 also includes a terminal connecting region 125 near one end of the substrate 100. The cathode current collector 120 generally comprises a conductor, such as gold, silver, copper, platinum, aluminum, or other conductive metal or conductive alloy thereof. The cathode current collector 120 may have a length of 50-80% of the length of the substrate 100 (not including the terminal connecting region 125) a width of 50-95% of the width of the substrate 100, and a thickness of 0.1-10 µm, but is not limited to these ranges. The terminal connecting region 125 may have a length, and independently a width, of 1-20 mm, although the invention is not limited to this range. The cathode current collector 120 may be selectively deposited by screen printing, inkjet printing, spray coating, etc., or formed by blanket deposition (e.g., sputtering or evaporation) and patterning (e.g., low-resolution photolithography, development and etching).

Figure 3A:
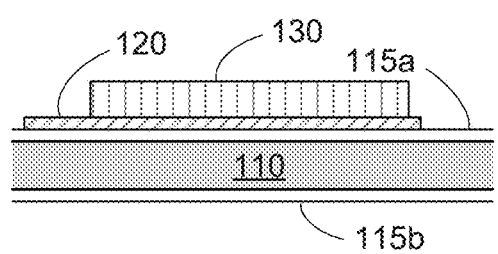
Figure 3B:
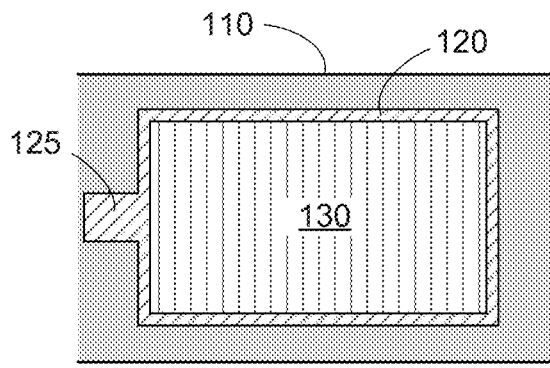

FIGS. 3A-B show a cathode 130 formed on the cathode current collector 120. The cathode 130 may comprise a lithium metal oxide or lithium metal phosphate, such as lithium cobalt oxide (LiCoO$_2$; LCO), lithium manganese oxide (LiMn$_2$O$_4$; LMO), or lithium iron phosphate (LiFePO$_4$; LPO), for example. The cathode 130 may be blanket deposited by laser deposition (e.g., pulsed laser deposition or PLD), sputtering, chemical vapor deposition (CVD), sol-gel processing, etc., or selectively deposited by screen printing, inkjet printing, spray coating or extrusion coating (e.g., using an ink comprising one or more sol-gel precursors and one or more solvents, having a viscosity appropriate for the printing or coating technique). The cathode 130 may have a length, and independently a width, of 50-98% of the length and width, respectively, of the cathode current collector 120 (not including the terminal connecting region 125, in the case of the length), and a thickness of 1-20 µm, although the dimensions of the cathode 130 are not limited to these ranges.

Figure 4A:
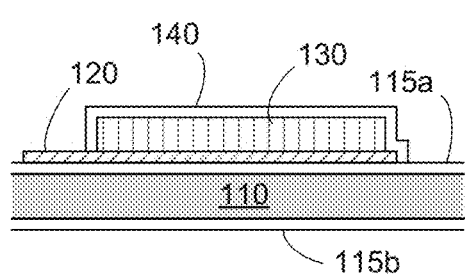
Figure 4B:
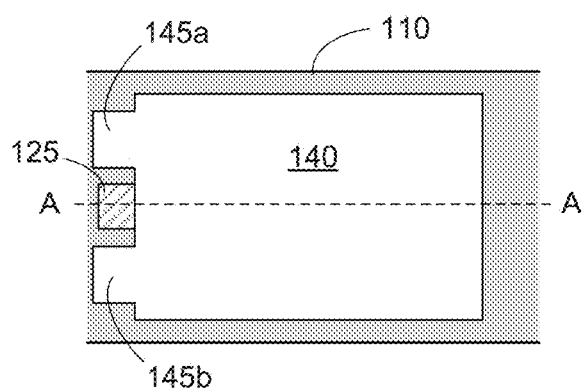

FIGS. 4A-B show an electrolyte layer 140 on the cathode 130 and the cathode current collector 120. The cross-section of FIG. 4A is taken along the line A-A in FIG. 4B. The electrolyte layer 140 also includes first and second terminal connecting support regions 145a-b near the same end of the substrate 100 as the terminal connecting region 125. The electrolyte layer 140 generally comprises a lithium-containing glass or ceramic material, such as lithium phosphorus oxynitride (LiPON), lithium borosilicates (Li$_2$O—B$_2$O$_3$—SiO$_2$), lithium vanadosilicates (Li$_2$O—V$_2$O$_5$—SiO$_2$), lithium aluminum/titanium phosphates (Li$_{1+x}$Al$_x$Ti$_{2-x}$(PO$_4$)$_3$, or LATP), lithium lanthanum zirconium oxide (Li$_7$La$_3$Zr$_2$O$_{12}$, or LLZO), etc., and can be deposited by sputtering, CVD, or atomic layer deposition (ALD). The electrolyte layer 140 may have a length, and independently a width, of 101-150% of the length and width, respectively, of the cathode current collector 120 (not including the terminal connecting region 125 and the terminal connecting support regions 145a-b, in the case of the length), but less than the length and width of the substrate 100. The electrolyte layer 140 may have a thickness of 0.1-5 µm, although it is not limited to this range.

Figure 5A:
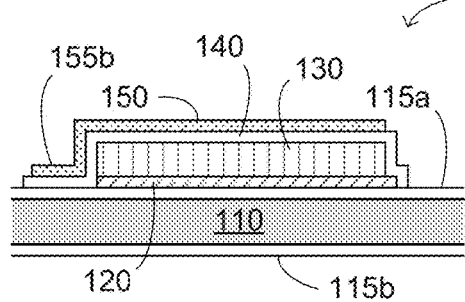
Figure 5B:
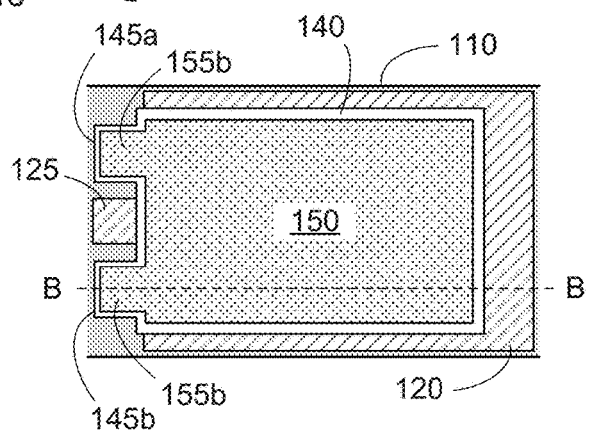

FIGS. 5A-B show an anode current collector 150 on the electrolyte layer 140, thus forming a complete (but unsealed) cell 160. The cross-section of FIG. 5A is taken along the line B-B in FIG. 5B. (A separately-formed anode is not necessary in solid-state lithium batteries, as a lithium anode can be formed between the electrolyte 140 and the anode current collector 150 during charging, although optionally, a thin lithium anode can be deposited by evaporation onto the electrolyte layer 140 prior to formation of the anode current collector 150.) The anode current collector 150 also includes first and second terminal connecting regions 155a-b on the terminal connecting support regions 145a-b. The anode current collector 150 generally comprises a conductive metal, such as nickel, zinc, copper, aluminum, etc., or another conductor, such as graphite. The anode current collector 150 can be selectively deposited by screen printing, inkjet printing, spray coating, etc., or formed by blanket deposition (e.g., sputtering or evaporation) and patterning (e.g., low-resolution photolithography, development and etching). The anode current collector 150 may have area dimensions (i.e., length and width dimensions) that are 80-99% of the length and width dimensions, respectively, of the electrolyte layer 140. The anode current collector 150 may have a thickness of 0.1-5 µm, although it is not limited to this range.

The completed cell 160 may further include one or more interlayers that modify the interfaces between layers. For example, a metal oxide (e.g., NbO$_2$, Al$_2$O$_3$, Li$_4$Ti$_5$O$_{12}$ or LiNbO$_3$) interlayer may be formed on the cathode 130 prior to deposition of the electrolyte 140 (e.g., to reduce interfacial stress, decrease interfacial resistance, or suppress formation of a space charge layer). An amorphous (e.g., elemental silicon) interlayer may be deposited on the electrolyte 140 prior to formation of the anode or anode current collector 150 to inhibit reduction of the electrolyte. In some embodiments, thermal annealing can modify the interface(s) between the layers of the cell, which can significantly reduce charge transfer resistance.

Exemplary Sealed Solid-State Batteries and Methods of Sealing the Batteries

Figure 6:
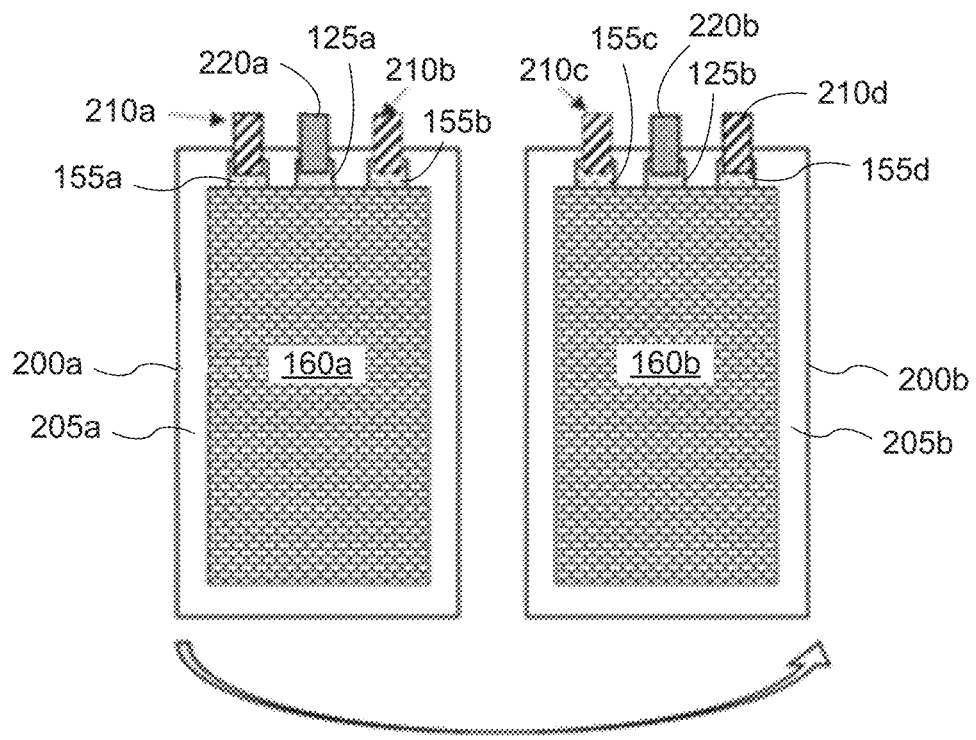
FIG. 6 is a top view prior to final assembly of an exemplary solid-state battery with three terminals, according to at least one embodiment of the present invention.
Figure 7:
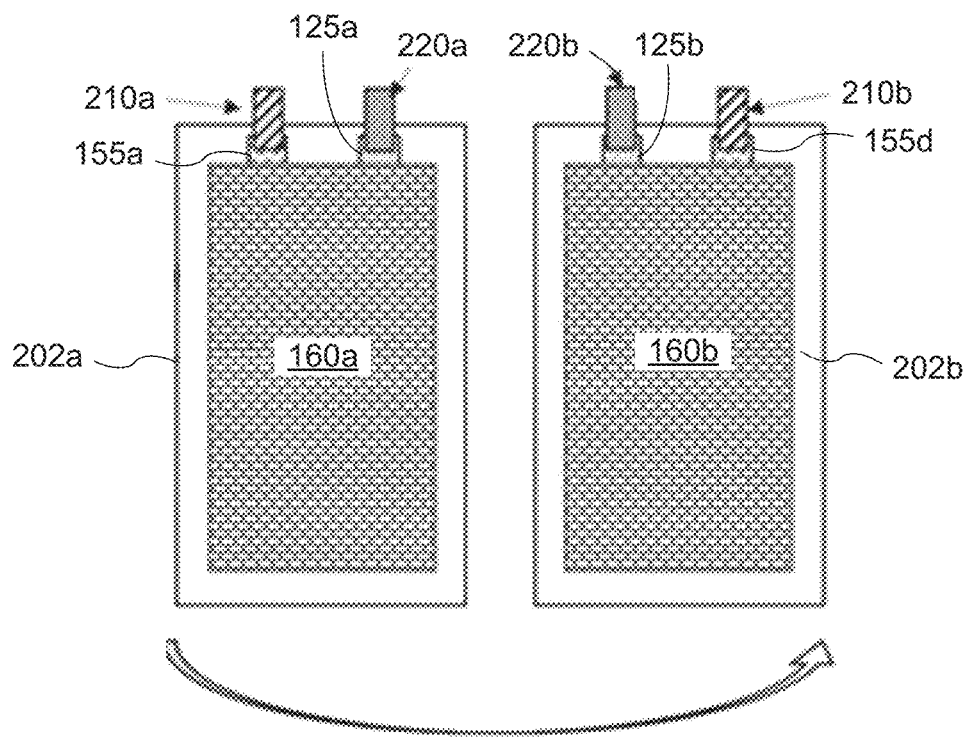
FIG. 7 is a top view prior to final assembly of an exemplary solid-state battery with two terminals, according to at least one embodiment of the present invention.

FIG. 6 is a layout view showing side-by-side, matching and/or complementary sealable cells 200a-b (or "die") for a symmetric device with three tabbed terminals 210a-d and 220a-b on the same side or end of the substrates 205a-b. Tabbed terminals 210a-d are negative terminals, and tabbed terminals 220a-b are positive terminals. One matching pair of the tabbed terminals 210a-d (e.g., terminals 210a and 210c, or terminals 210b and 210d) may be used for coupling to a thermistor (e.g., to control, or prevent battery overheating during, a charging operation). Thus, the second matching pair of tabbed terminals 210a-d is optional. FIG. 7 is a layout view showing exemplary sealable cells 202a-b for a device with two terminals 210a-b and 220a-b on the same side or end of the substrates 205a-b. Cells 202a-b are identical to cells 200a-b, other than the number of terminal connecting regions 155a-d and terminals 210.

The battery stacks 160a-b (including the terminal connecting regions 125a-b and 155a-d) on the substrates 205a-b are identical to each other, and may be as described with regard to FIGS. 1A-5B. Tabbed terminals 210a-d and 220a-b may comprise a metal foil or strip (e.g., of aluminum, copper, nickel, stainless steel, a combination thereof, etc.) may be adhered or affixed to the respective terminal connecting regions 155a-d and 125a-b by crimping, laser welding, ultrasonic welding, conductive adhesive, a combination thereof, etc. In one embodiment, the tabbed terminals 210a-d in contact with the anode current collector (not shown in FIGS. 6-7) comprise or consist essentially of copper foil, and the tabbed terminals 220a-b in contact with the cathode current collector comprise or consist essentially of aluminum foil.

Prior to sealing, and if not already done, the individual battery stacks 160a-b may be patterned so that when one cell is flipped on to the other cell, the terminals 210a-d and 220a-d are aligned. In some embodiments, for mechanical robustness during processing, the substrates 205a-b may be up to 100 µm thick (or more). However, the substrate (prior to separation and/or singulation) may comprise a metal roll having a native thickness>10 µm, and more typically >20 µm. Prior to sealing, the substrates 205a-b may be thinned.

To increase or maximize the overall contribution (e.g., the energy density) of the active battery stack, one may reduce the thickness of the substrates 205a-b. The metal in the substrates 205a-b may be thinned down to 10 µm or less (e.g., <5 µm), but should have a thickness sufficient to maintain its hermetic sealing capability against ingress of oxygen and water. This minimum thickness may be from 2 µm to <5 µm (e.g., 3 or 4 µm), but the invention is not so limited.

Substrate thinning may thus comprise (but is not limited to) blanket wet chemical etching, grinding, mechanical polishing, or a combination of chemical etching and mechanical polishing. Typically, the backside of the substrates 205a-b (e.g., having the barrier 115b thereon, in the case of the substrate 110 in FIGS. 1A-5B) is thinned while protecting the front (IC) side with the cells 160a-b thereon from being attacked by the etchant, mechanical polisher, or other potential source of damage. In some embodiments, the front side of the substrates 205a-b may be protected with a blanket protective film on or over the respective stack 160a-b. The protective film, which may comprise a thermoplastic polymer film or layer such as poly(tetrafluoroethylene), can be released in a subsequent step when applying the thinned battery 200a-b to a carrier film (not shown). Alternatively, when the substrate 205a-b has a thickness of >100 µm, the backside of the substrate 205a-b may be polished first to a thickness of about 100 µm, then thinned by one or more of the other methods described above, and then processed to stack the battery cell(s).

After the battery stacks 160a-b are formed on the respective substrates 205a-b, and the substrates 205a-b optionally thinned, the die 200a-b may be singulated by laser dicing, wet chemical etching, mechanical sawing or punching, a combination thereof, etc.

Prior to tabbing (i.e., placing, affixing or adhering the terminal tabs 210a-d and 220a-d to the terminal connecting regions 125a-b and 155a-d) or sealing, the sidewalls of the substrates 205a-b should be insulated (e.g., to prevent short circuits during the tabbing or sealing processes). Thus, as shown in FIGS. 8-11, an insulating material 215a-b such as an epoxy (e.g., SU-8), a polyimide or other thermoplastic insulating organic polymer can be printed or dispensed along the exposed sidewalls of the respective substrates 205a-b. Deposition techniques can include inkjetting, aerosol jet spraying, screen printing, gravure printing, etc.

In the tabbing process, terminals 210a-d and 220a-d are brought into ohmic contact with the terminal connecting regions 125a-b and 155a-d and extended to the outside of the final package (i.e., beyond the edge of the substrate 205a-b). Tabbing is a conventional process in manufacturing Li-ion battery cells. The tabs 210a-d and 220a-d (which are commercially available, e.g. from Targray, Kirkland, Canada) are placed on the terminal connecting regions 125a-b and 155a-d so that at least part of the tabs 210a-d and 220a-d extend beyond the edge of the substrate 205a-b, and are attached by ultrasonic welding or another technique as described herein. The tabs 210a-d and 220a-d are affixed or attached to the cells 200a-b before the cells 200a-b are combined.

Figure 8:
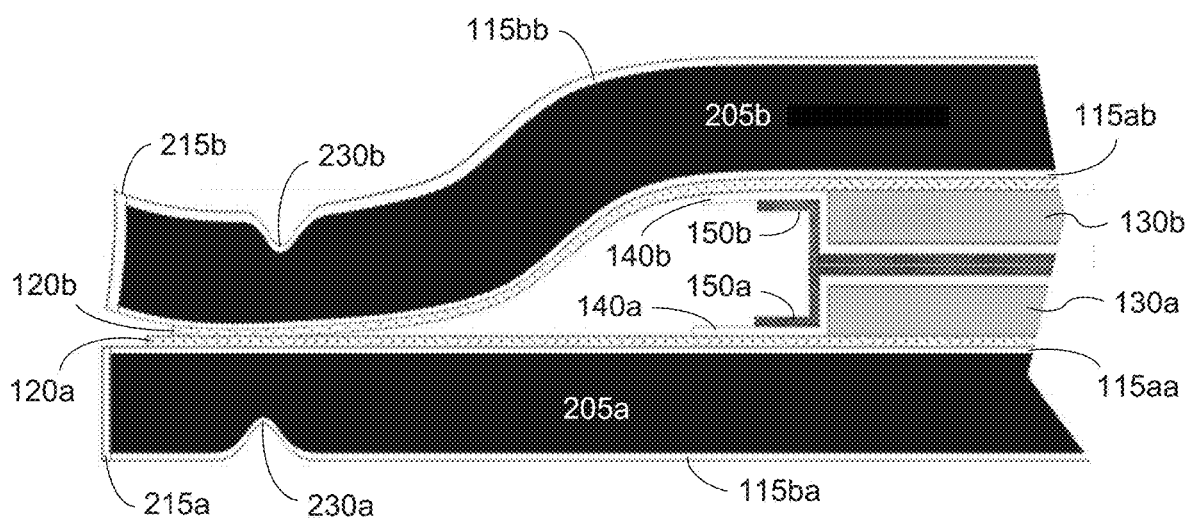
FIG. 8 is a cross-sectional view of an exemplary two-cell solid state battery hermetically sealed with an ultrasonic weld, according to at least one embodiment of the present invention.

Sealing the two cells 200a-b can be done in a number of different ways. For example, the two cells 200a-b are stacked together face-to-face in a frame (not shown) so that the active cell layers (e.g., the stacks 160a-b) are adjacent, and the substrates 205a-b are on the outside, as shown in FIG. 8, and the cells 200a-b are sealed by ultrasonic welding. An ultrasonic welder, equipped with a horn in the shape of the perimeter of the substrates 205a-b or cell, seals the exterior of the cells, creating a hermetic seal 230a-b. The perimeter portions or peripheral edges of the substrate 205b are bent toward the front face (e.g., slightly beyond the anode current collector 150) prior to welding. Alternatively, the perimeter portions or peripheral edges of the substrates 205a-b can be brought into contact using, e.g., a press or clamp.

Figure 18:
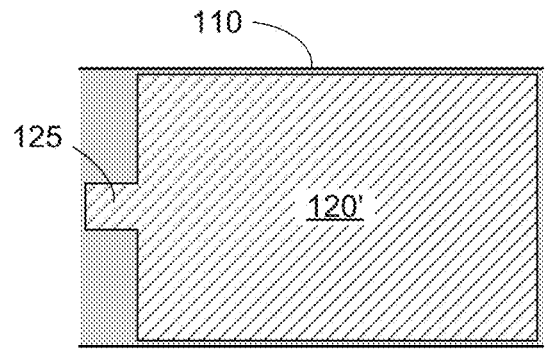
FIGS. 18-19 are top or layout views of exemplary intermediate and final structures in an exemplary alternative method of making a battery stack with tabbed terminals at opposite ends of the battery, according to at least one embodiment of the present invention.
Figure 19:
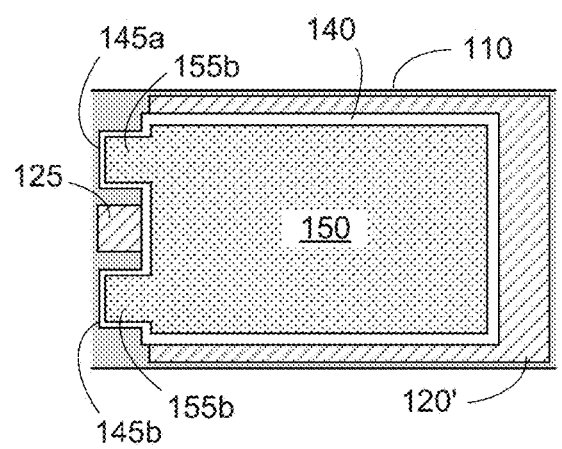

As shown in FIG. 8, ohmic contact can be made between the cathode current collector layers 120a-b. In such a case, the layout view of the cathode current collector 120 may be as shown in FIG. 18, and the layout of the final stack for the cells 200a-b may be as shown in FIG. 19. However, when the cathode current collectors 120a-b are not present in the region of the substrates 205a-b being sealed (e.g., as in the layout of FIG. 2B), the seal is barrier-to-barrier (i.e., between inner barriers 115aa-ab), except in the locations where the positive terminal tabs 220a-b and (optionally) the cathode current collector terminal connecting regions 125*a-b* extend to the seal. In these locations, the seal is cathode current collector 125*a* to cathode current collector 125*b* (e.g., as shown in FIG. 8) and tab 210*a* to tab 210*b*. Furthermore, only one of the cells 200*a-b* is required to have terminal tabs 210-220 when the battery is sealed by ultrasonic welding. In such embodiments, the seal in the region of the tab 210 or 220 is tab to cathode current collector 125.

Figure 9:
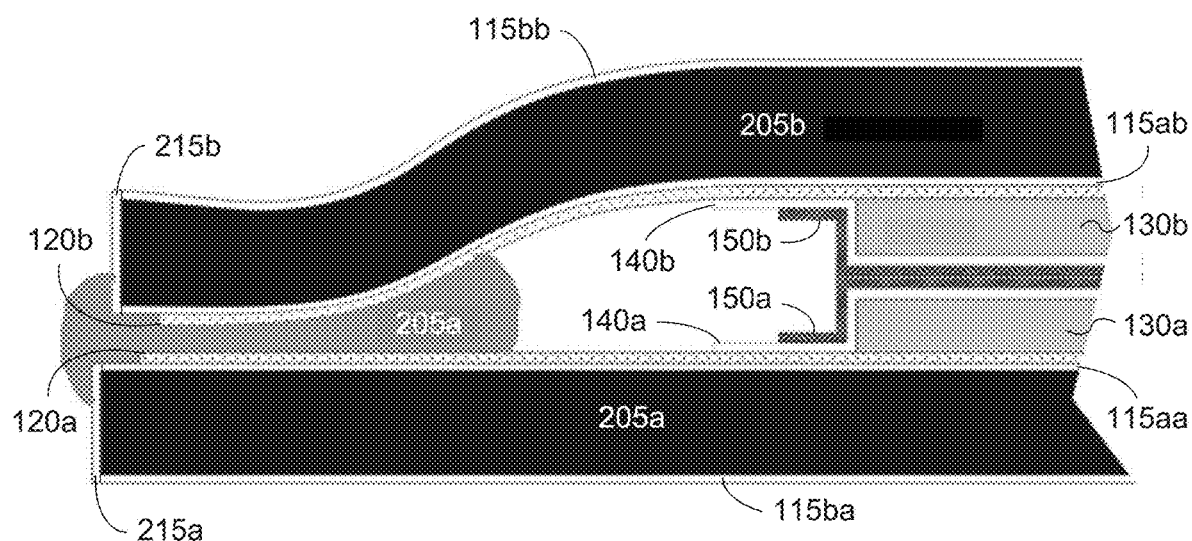
FIG. 9 is a cross-sectional view of an exemplary two-cell solid state battery hermetically sealed with an epoxy, according to at least one embodiment of the present invention.

FIG. 9 shows sealing using an epoxy. The process for joining the cells 200*a-b* is the same as for ultrasonic welding except for the sealing. The first cell 200*a* is placed in a frame (not shown) with the substrate 205*a* down. An epoxy 240 is dispensed around the perimeter of the cell 200*a*. The second cell 200*b* is placed face down on the first cell 200*a* and pressed down to a gauged level (e.g., to a predetermined total height of the combined cells 200*a-b* as measured using a gauge). The epoxy 240 is then cured (e.g., by irradiation with ultraviolet [UV] light). In the case of sealing with an epoxy, both cells 200*a-b* include the terminal tabs 210-220. When both cells 200*a-b* include terminal tabs (e.g., 210*a-d* [or, alternatively, 210*a* and 210*c*] and 220*a-b*), the matching/overlapping terminal tabs may be joined to each other by ultrasonic welding.

Figure 10:
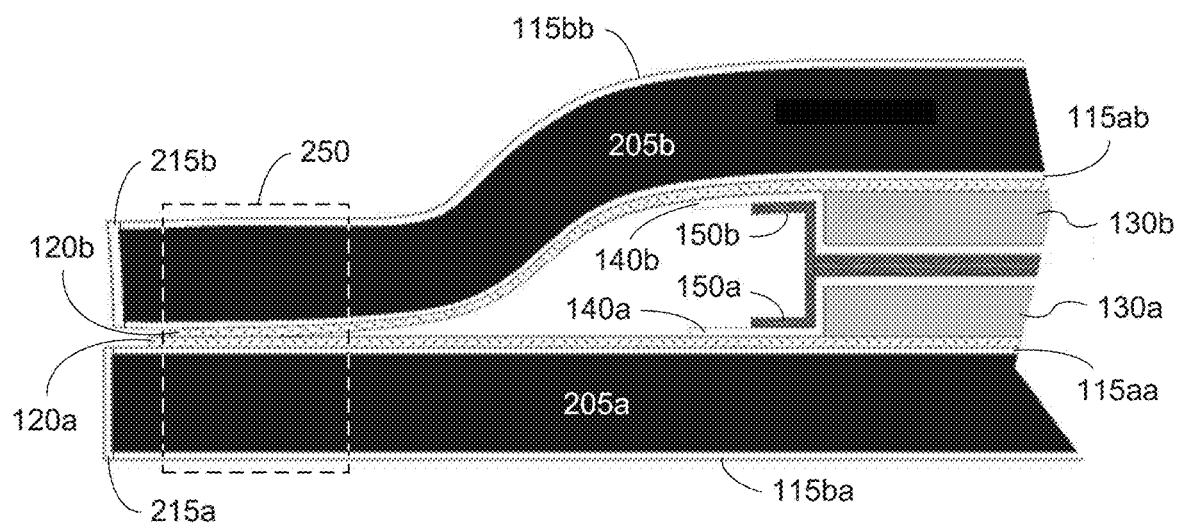
FIG. 10 is a cross-sectional view of an exemplary two-cell solid state battery hermetically sealed with an anodic bond, according to at least one embodiment of the present invention.

FIG. 10 shows sealing using an anodic seal. The process for joining the cells 200*a-b* is the same as for ultrasonic welding except for the sealing. The first cell 200*a* is placed in a frame with the substrate 205*a* down. After bending the peripheral portions or edges of the second cell 200*b* towards the front face to facilitate contact with the first cell 200*a*, the second cell 200*b* is placed face down on the first cell 200*a*. Alternatively, the perimeter portions or peripheral edges of the substrates 205*a-b* can be pressed or clamped together after the second cell 200*b* is placed on the first cell 200*a*. The substrates are then heated to 200° C.-400° C., and an electrostatic field is applied to the perimeter of the substrates 205*a-b* to create the seal 250. For example, the electrostatic field may have a strength of 0.2-5 kV A temperature less than 200° C. (e.g., 100-195° C.) may also be used. In order to heat just the areas or regions to be bonding, the anodic heating/bonding equipment may have an outer lip or rim on the otherwise substantially flat (or recessed) bonding perimeter to minimize heating across the cell. Anodic sealing may be performed using cells having the layout of either FIG. 5B or FIG. 19. Furthermore, only one of the cells 200*a-b* is required to have terminal tabs 210-220 when the battery is sealed by anodic sealing.

Figure 11:
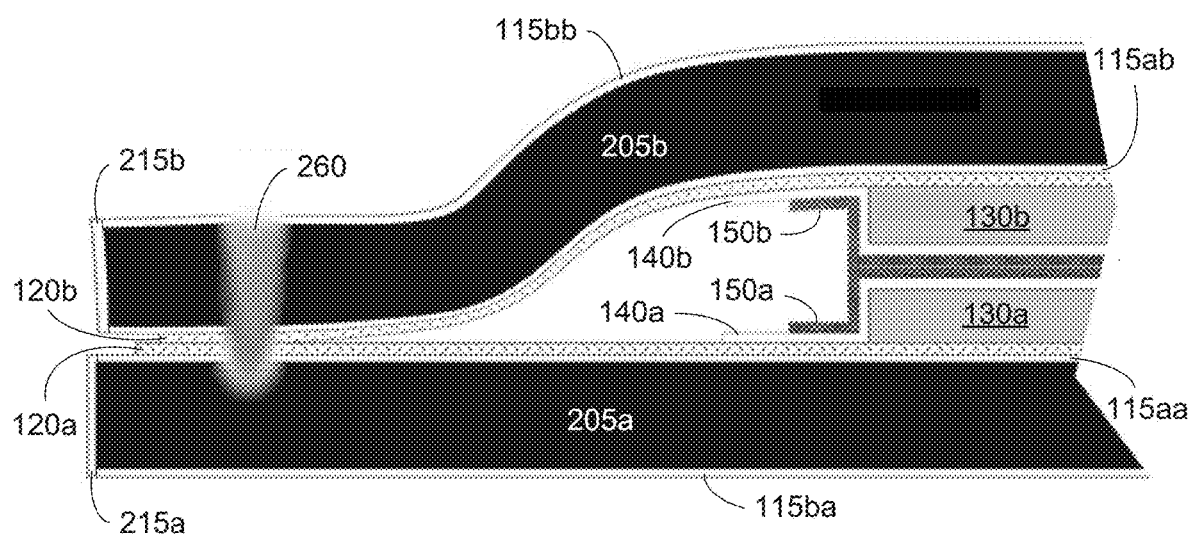
FIG. 11 is a cross-sectional view of an exemplary two-cell solid state battery hermetically sealed with a laser weld, according to at least one embodiment of the present invention.

FIG. 11 shows sealing using a laser weld. The process for joining the cells 200*a-b* is the same as for ultrasonic welding except for the sealing. The first cell 200*a* is placed in a frame with the substrate 205*a* down. After bending the peripheral portions or edges of the second cell 200*b* towards the front face to facilitate contact with the first cell 200*a*, the second cell 200*b* is placed face down on the first cell 200*a*. Alternatively, the perimeter portions or peripheral edges of the substrates 205*a-b* can be pressed or clamped together after the second cell 200*b* is placed on the first cell 200*a*. A laser welder then irradiates the periphery of the second substrate 205*b* in a pattern (e.g., from 1 to 5 mm from the edge of the second substrate 205*b*), using light having a wavelength of 750-980 nm at a power of 5-500 W., typically diode pumped and emitted through a fiber. The radiation emitted by the laser welder may be pulsed or continuous. Laser welding may be performed using cells having the layout of either FIG. 5B or FIG. 19. Furthermore, only one of the cells 200*a-b* is required to have terminal tabs 210-220 when the battery is sealed by laser welding.

Figure 12A:
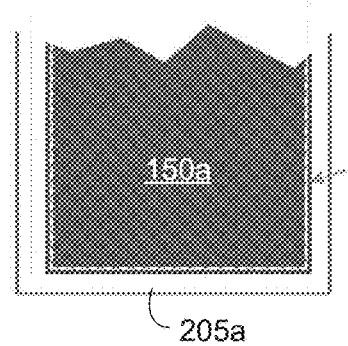
FIGS. 12A-B are top-down and cross-sectional views of an exemplary two-cell solid state battery having an interstitial ring or spacer therein, according to at least one embodiment of the present invention.
Figure 12B:
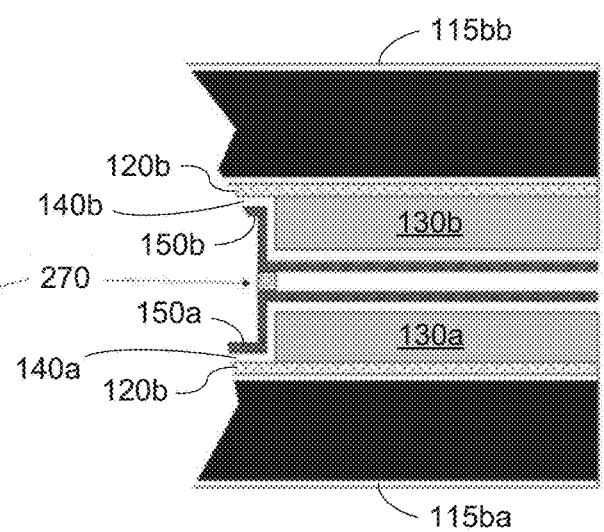

FIGS. 12A-B show an embodiment including an interstitial layer (e.g., spacer) for expansion and contraction of the materials inside the hermetically sealed battery. FIG. 12A is a layout view of the battery cell 200*a*, and FIG. 12B is a cross-section of the two-cell battery in the region of the battery including edges of the cathodes 130*a-b* and steps in the electrolytes 140*a-b* and anode current collectors 150*a-b*. During charging of a depleted cell, the battery expands slightly (on the order of ~2 μm) when the device is fully charged, due to the deposition of lithium on the anode current collector. During discharge, the lithium is depleted, resulting in contraction by the same amount. If minimal expansion and contraction is desired or warranted, a compressible interstitial ring 270 can be added to the peripheral region of the anode current collector 150*a* to provide room for expansion and contraction during charging and recharging of the two-cell battery.

In further embodiments, individual pairs of cells (e.g., 205*a-b*) can be further stacked to increase the capacity to a predetermined level (e.g., a maximum voltage or current) for a particular application. Such stacked cells can be electrically joined in series, in parallel, or in one or more combinations of series and parallel cells.

Figure 15A:
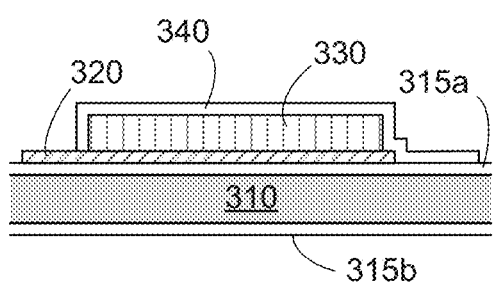
Figure 15B:
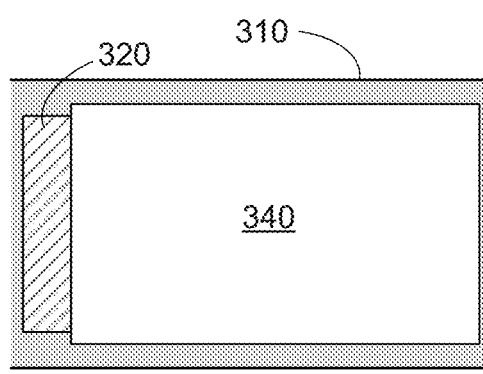
Figure 16A:
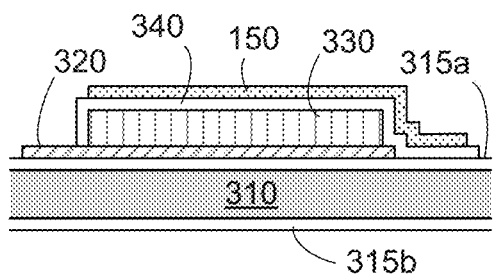
Figure 16B:
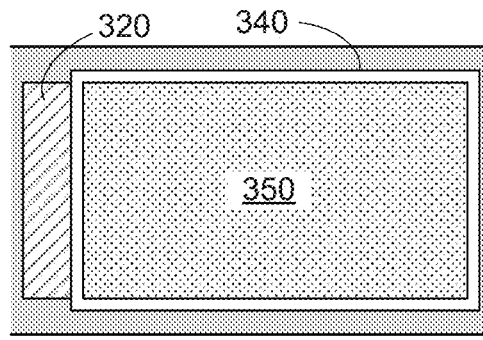
Figure 17:
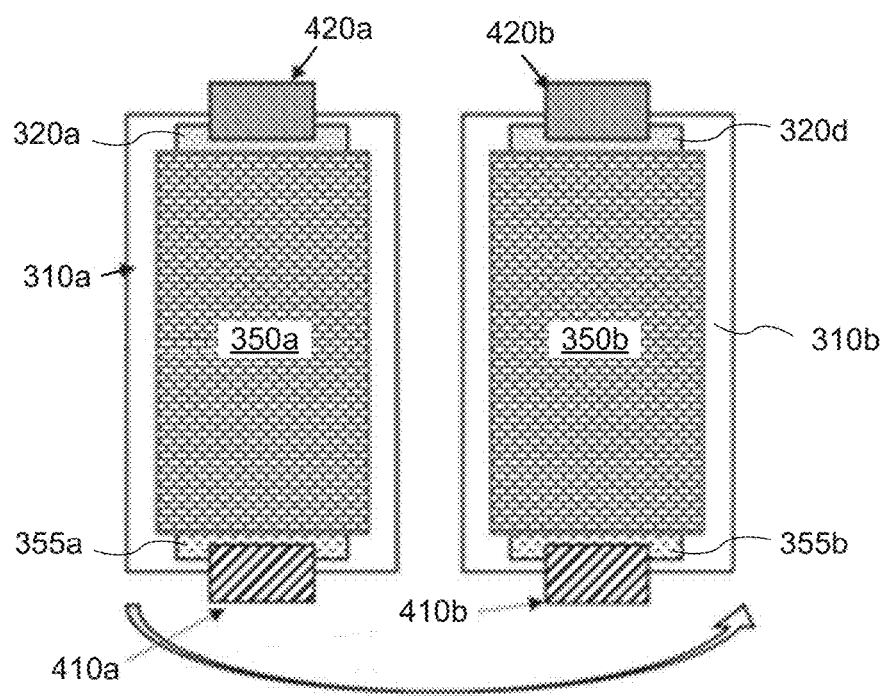
FIG. 17 is a top view prior to final assembly of an exemplary solid-state battery with two terminals at opposite ends of the cell, according to at least one embodiment of the present invention.

An Exemplary Alternative Battery Stack, Sealed Solid-State Battery, and Method of Making the Same FIGS. 13-16B show intermediate and final structures in an exemplary alternative method of making a battery stack with tabbed terminals at opposite ends of the battery, and FIG. 17 is a layout view showing side-by-side, matching and/or complementary sealable cells or die 300*a-b* for a device with tabbed terminals 410*a-b* and 420*a-b* on opposite ends of the substrates 305*a-b*.

Figure 13:
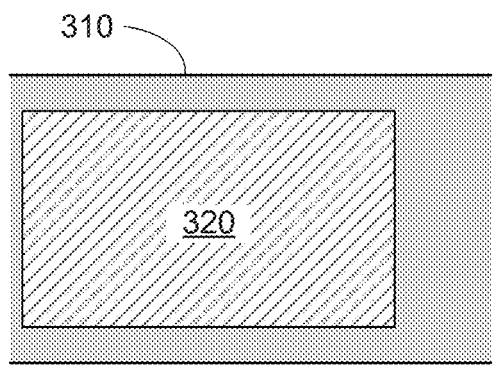
FIGS. 13-16B show intermediate and final structures in an exemplary method of making a battery stack with tabbed terminals at opposite ends of the battery, according to embodiments of the present invention.

FIG. 13 show the metal substrate 100 with a cathode current collector 320 thereon. The cathode current collector 320 is the same as the cathode current collector 120 discussed above, except for the pattern. In the case of the cathode current collector 320, it can also be formed by extrusion coating.

Figure 14:
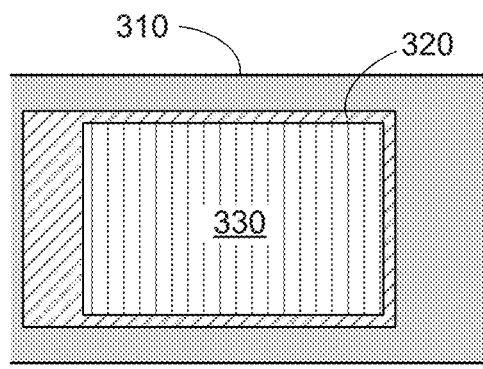

FIG. 14 shows a cathode 330 formed on the cathode current collector 320. The cathode 330 is essentially the same as the cathode 130 described above.

FIGS. 15A-B show an electrolyte layer 340 on the cathode 330 and the cathode current collector 320. FIG. 15A is a cross-section of the layout view shown in FIG. 15B. The electrolyte layer 340 is essentially the same as the electrolyte layer 140 described above, except for the pattern. As for the cathode current collector 320, the electrolyte layer 340 can also be formed by extrusion coating.

FIGS. 16A-B show an anode current collector 350 on the electrolyte layer 340, thus forming a complete (but unsealed) cell 300. FIG. 16A is a cross-section of the layout shown in FIG. 16B. The anode current collector 350 is essentially the same as the anode current collector 150 described above, but it can also be formed by extrusion coating.

FIG. 17 shows matching and/or complementary sealable cells 300*a-b* for a device with tabbed terminals 210*a-b* and 220*a-b* on opposite ends or sides of the substrates 310*a-b*. Tabbed terminals 310*a-b* are negative terminals, and tabbed terminals 320*a-b* are positive terminals. Cells 300*a-b* are identical to each other. The terminal connection regions 355*a-b* are continuous, but not coplanar, with the anode current collectors 350*a-b*. Alternatively, the uppermost/exposed layer 350*a-b* may be an encapsulation layer covering the anode current collector and comprising an organic polymer. The cells 300*a-b* may be processed and sealed using any of the techniques described above for the exemplary batteries having the terminals at one side or end.

CONCLUSION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of manufacturing a battery, comprising:
   a) forming a first solid-state battery cell on a first metal foil;
   b) forming a second solid-state battery cell on a second metal foil;
   c) placing the second battery cell on the first battery cell so that the first and second battery cells are between the first and second metal foils; and
   d) hermetically sealing the first and second battery cells between the first and second metal foils in a peripheral region of the first and second metal foils,
   wherein each of the first and second metal foils comprises steel, copper, aluminum, nickel, inconel, brass, molybdenum, titanium, or an alloy of copper, aluminum, nickel, molybdenum or titanium with up to 10% of one or more other elements.

2. The method of claim 1, wherein forming each of the first and second battery cells comprises:
   a) forming a cathode current collector on the respective metal foil;
   b) forming a cathode on or over the cathode current collector;
   c) forming a solid-state electrolyte on or over the respective cathode; and
   d) forming an anode current collector on or over the respective solid-state electrolyte.

3. The method of claim 1, further comprising forming a barrier on entire major surfaces of the first and second metal foils.

4. The method of claim 1, wherein hermetically sealing the first and second battery cells comprises ultrasonic welding, applying an electrostatic field to the peripheral region of the first and second metal foils to form an anodic seal, or laser welding.

5. The method of claim 4, wherein the peripheral region of the first and second metal foils is within 10 mm of all edges of the first and second metal foils.

6. The method of claim 1, wherein hermetically sealing the first and second battery cells comprises applying an epoxy adhesive in the peripheral region of one of the first and second metal foils prior to placing the second battery cell on the first battery cell, and curing the epoxy adhesive.

7. The method of claim 2, wherein each cathode current collector and each anode current collector comprises one or more terminal connection regions at an end or side thereof, and the method further comprises attaching or affixing (i) a first terminal tab to at least one of the cathode current collectors and (ii) a second terminal tab to least one of the anode current collectors.

8. The method of claim 1, wherein hermetically sealing the first and second battery cells between the first and second metal foils comprises ultrasonically welding the first and second metal foils together using an ultrasonic welder equipped with a horn having a shape of the peripheral region of the first and second metal foils.

9. The method of claim 8, wherein after hermetically sealing the first and second battery cells between the first and second metal foils, the cathode current collector on the first metal foil contacts the cathode current collector on the second metal foil in the hermetic seal.

10. The method of claim 1, wherein hermetically sealing the first and second battery cells between the first and second metal foils comprises anodically sealing the peripheral regions of the first and second metal foils together after the second battery cell is placed on the first battery cell, at a temperature of 100° C.-400° C., and using an electrostatic field having a strength of 0.2-5 kV.

11. The method of claim 1, further comprising placing an interstitial ring or spacer on one of the first and second battery cells before placing the second battery cell on the first battery cell.

12. The method of claim 1, wherein each of the first and second metal foils comprises stainless steel.

13. The method of claim 1, wherein each of the first and second metal foils has a thickness of 10-100 µm.

14. The method of claim 3, wherein the barrier comprises silicon dioxide, aluminum oxide, silicon nitride, a silicon and/or aluminum oxynitride, aluminum nitride, titanium nitride, titanium aluminum nitride, or tungsten nitride.

15. The method of claim 14, wherein the barrier has a total thickness of 0.5-3 µm.

16. The method of claim 2, wherein:
   a) the cathode current collector is formed by screen printing, inkjet printing, spray coating, or sputtering or evaporation and patterning, and comprises gold, silver, copper, platinum, aluminum, or a conductive alloy thereof;
   b) the cathode is formed by laser deposition, sputtering, chemical vapor deposition, sol-gel processing, screen printing, inkjet printing, spray coating or extrusion coating, and comprises a lithium metal oxide or a lithium metal phosphate;
   c) the solid-state electrolyte is formed by sputtering, CVD, or atomic layer deposition, and comprises a lithium phosphorus oxynitride, a lithium borosilicate, a lithium vanadosilicate, a lithium aluminum/titanium phosphate, or lithium lanthanum zirconium oxide; and
   d) the anode current collector is formed by screen printing, inkjet printing, spray coating, or sputtering or evaporation and patterning, and comprises nickel, zinc, copper, aluminum, or graphite.

17. The method of claim 16, wherein:
   a) the cathode current collector has (i) a length that is 50-80% of a length of the first and second metal foils, not including an optional terminal connecting region on the first and second metal foils, (ii) a width that is 80-99% of a width of the first and second metal foils and (ii) a thickness of 0.1-10 µm;
   b) the cathode has (i) a length and a width that are 50-98% of the length and the width, respectively, of the cathode current collector and (ii) a thickness of 1-20 µm;

c) the solid-state electrolyte has (i) a length and a width that are 101-150% of the length and the width, respectively, of the cathode and (ii) a thickness of 0.1-5 µm; and d) the anode current collector has (i) length and width dimensions that are 80-99% of the length and the width, respectively, of the solid-state electrolyte and (ii) a thickness of 0.1-5 µm.

18. The method of claim 1, further comprising reducing a thickness of each of the first and second metal foils to 2-10 µm.

19. The method of claim 18, wherein reducing the thickness of each of the first and second metal foils comprises blanket wet chemical etching, grinding, mechanical polishing, or a combination of chemical etching and mechanical polishing.

20. The method of claim 1, wherein hermetically sealing the first and second battery cells between the first and second metal foils comprises placing the first battery cell on the first metal foil in a frame, dispensing an epoxy around a perimeter of the first battery cell, placing the second battery cell face down on the first battery cell, pressing down to a predetermined total height of the combined first and second battery cells, and curing the epoxy by irradiation with ultraviolet light.

21. The method of claim 1, wherein each of the first and second solid-state and/or thin-film battery cells are formed on a sheet or roll comprising the first and second metal foils, and the method further comprises singulating the first and second metal foils from the sheet or roll by laser dicing, wet chemical etching, mechanical sawing or punching, or a combination thereof.

* * * * *